(12) United States Patent
Meinhold et al.

(10) Patent No.: US 12,498,285 B2
(45) Date of Patent: Dec. 16, 2025

(54) DIFFERENTIAL GAS SENSOR WITH TWO SENSOR COMPONENTS AND USE FOR DETECTION OF GASES

(71) Applicant: Infineon Technologies AG, Neubiberg (DE)

(72) Inventors: Dirk Meinhold, Dresden (DE); Florian Brandl, Maxhuette-Haidhof (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 247 days.

(21) Appl. No.: 17/818,988

(22) Filed: Aug. 11, 2022

(65) Prior Publication Data

US 2023/0059356 A1 Feb. 23, 2023

(30) Foreign Application Priority Data

Aug. 20, 2021 (DE) .......................... 102021121641.9

(51) Int. Cl.
*G01M 3/04* (2006.01)
(52) U.S. Cl.
CPC ..................................... *G01M 3/04* (2013.01)
(58) Field of Classification Search
None
See application file for complete search history.

(56) References Cited

U.S. PATENT DOCUMENTS

| 2006/0185979 A1* | 8/2006 | Suda | G01N 27/4074 |
| | | | 204/431 |
| 2016/0103082 A1* | 4/2016 | Kimura | G01N 33/005 |
| | | | 73/25.01 |
| 2021/0310983 A1* | 10/2021 | Hayashi | G01N 27/4074 |
| 2022/0196585 A1* | 6/2022 | Perez Barraza | G01N 27/128 |
| 2022/0292895 A1* | 9/2022 | Ren | G08B 21/182 |

FOREIGN PATENT DOCUMENTS

| DE | 4210398 A1 | | 10/1993 |
| JP | H05180798 A | * | 7/1993 |
| JP | 2002239352 A | | 8/2002 |
| JP | 2017062119 A | | 3/2017 |

OTHER PUBLICATIONS

English Translation of JP 2019-062119 (Year: 2019).*
English translation of JP-H05180798-A (Year: 1993).*

* cited by examiner

*Primary Examiner* — Alexander A Mercado
(74) *Attorney, Agent, or Firm* — Slater Matsil, LLP

(57) ABSTRACT

A differential gas sensor includes a first sensor component to selectively detect a first gas present in the environment and to supply a first output signal, a second sensor component configured to supply a second output signal, and a circuit configured to determine a difference between the first output signal and the second output signal.

24 Claims, 3 Drawing Sheets

DIFFERENTIAL GAS SENSOR WITH TWO SENSOR COMPONENTS AND USE FOR DETECTION OF GASES

This application claims the benefit of German Patent Application No. 10 2021 121641.9, filed on Aug. 20, 2021, which application is hereby incorporated herein by reference.

TECHNICAL FIELD

The present disclosure relates to a gas sensor, and to the use of same for detecting gases, in particular hydrogen.

BACKGROUND

The fuel cell is becoming increasingly important in the field of electromobility. The operation of fuel cells relies primarily on hydrogen. A fuel cell system operated with hydrogen gas ($H_2$) has one or more hydrogen stores in addition to a fuel cell. Such hydrogen stores, for example when used in a motor vehicle, can be designed as cylinders in which the hydrogen is stored under an elevated pressure of approximately 700 bar. If a plurality of such hydrogen stores are arranged in the motor vehicle, a range of the motor vehicle can be designed accordingly.

For the operation of a fuel cell system in a motor vehicle, the safety aspect is of particular importance. Since gaseous hydrogen reacts exothermically with oxygen from the air in a wide ignition range even with low ignition energy (oxyhydrogen reaction), it is extremely important to detect, safely and reliably, the presence of hydrogen outside the hydrogen stores and the fuel cell, supply lines and discharge lines.

These and other reasons motivate a need for the present disclosure.

SUMMARY

A first aspect of the present disclosure relates to a differential gas sensor, comprising a first sensor component configured to selectively detect a first gas present in the environment and to supply a first output signal, a second sensor component configured to supply a second output signal, and a circuit configured to determine a difference between the first output signal and the second output signal.

A second aspect of the present disclosure relates to a use of a gas sensor according to the first aspect for detection of a gas, in particular hydrogen.

BRIEF DESCRIPTION OF THE DRAWINGS

A gas sensor in accordance with the disclosure is explained in greater detail below with reference to drawings. The elements shown in the drawings are not necessarily rendered in a manner true to scale relative to on another. Identical reference signs can designate identical components. Identical reference numerals designate corresponding identical or similar parts.

FIGS. 4A and 4B shows two exemplary embodiments based on pressure-sensitive sensors, wherein FIG. 4A shows a stress-based first sensor element (right), in which the partial pressure of the surrounding hydrogen changes the film stress of the functional layer and this results in bending of the pressure-sensitive membrane, and wherein the reference sensor (left) is likewise pressure-sensitive, but does not have a functional layer, and wherein FIG. 4B likewise shows an exemplary embodiment based on pressure-sensitive sensors, wherein the cavity in the case of the sensor (right) is sealed by a hydrogen-permeable membrane, and in the case of the reference sensor (left) the cavity is sealed by a material that is impermeable to all gases.

DETAILED DESCRIPTION OF ILLUSTRATIVE EMBODIMENTS

In the following detailed description, reference is made to the accompanying drawings, which form part of this description and show for illustration purposes specific embodiments in which the disclosure can be practiced. In this case, direction-indicating terminology such as "at the top", "at the bottom", "at the front", "at the back", "leading", "trailing", etc. is used with respect to the orientation of the figure(s) described. Since the constituents of embodiments can be positioned in different orientations, the direction designation is used for illustration and is not restrictive in any way. It goes without saying that other embodiments can also be used, and structural or logical changes can be made, without the scope of the present disclosure being exceeded. Therefore, the following detailed description should not be understood to be restrictive, and the scope of the present disclosure is defined by the appended claims.

It goes without saying that the features of the various exemplary embodiments described here can be combined with one another, unless expressly indicated otherwise.

As used in this specification, the terms "adhesively bonded", "secured", "connected", "coupled" and/or "electrically connected/electrically coupled" do not mean that the elements or layers must be directly contacted with one another; intermediate elements or layers can be provided between the "adhesively bonded", "secured", "connected", "coupled" and/or "electrically connected/electrically coupled" elements. In accordance with the disclosure, however, the terms mentioned above may optionally also have the specific meaning that the elements or layers are directly contacted with one another, that is to say that no intermediate elements or layers are provided between the "adhesively bonded", "secured", "connected", "coupled" and/or "electrically connected/electrically coupled" elements.

Furthermore, the word "over" used with regard to a part, an element or a material layer that is formed or arranged "over" a surface may mean herein that the part, the element or the material layer is arranged (e.g., positioned, formed, deposited, etc.) "indirectly" on the implied surface, wherein one or more additional parts, elements or layers are arranged between the implied surface and the part, the element or the material layer. However, the word "over" used with regard to a part, an element or a material layer that is formed or arranged "over" a surface may optionally also have the specific meaning that the part, the element or the material layer is arranged (e.g., positioned, shaped, deposited, etc.) "directly on", e.g. in direct contact with, the implied surface.

Figure 1:
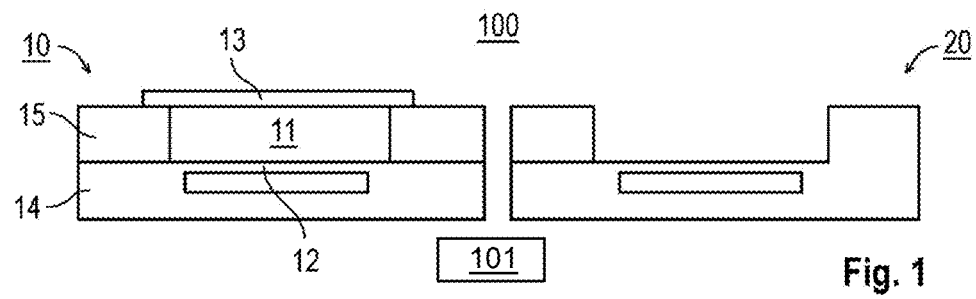
FIG. 1 shows a lateral cross-sectional view of one exemplary embodiment of a differential gas sensor, in which the first (left) sensor element has a hydrogen-permeable layer and the second (right) sensor element is open to the environment.

FIG. 1 shows one exemplary embodiment of a differential gas sensor in accordance with the present disclosure.

A differential gas sensor 100 in FIG. 1 comprises a first sensor component 10 configured to selectively detect a first gas present in the environment and to supply a first output signal. Furthermore, the differential gas sensor 100 has a second sensor component 20 configured to detect all gas partial pressures present in the environment and to supply a second output signal, and a circuit 101 configured to determine a difference between the first output signal and the second output signal.

Since temperature influences the measurement accuracy of a pressure sensor, a small temperature error indicated as a temperature coefficient always remains despite diverse compensation measures. This coefficient describes a (linear) error, proceeding from a reference point, which is room temperature in most cases. Accordingly, the temperature error is zero at room temperature and rises linearly with the indicated coefficient as the difference between the temperature and room temperature increases.

In all of the embodiments shown here, the first sensor component carries out the actual detection of the gas to be measured, while the second sensor component is always the reference sensor component. The sensor components are embodied as structurally identically as possible and thus have mutually matched—ideally identical temperature coefficients. The temperature error is thus eliminated on account of the difference formation in the circuit.

The exemplary embodiment in FIG. 1 is furthermore configured such that the first output signal of the first sensor component 10 is representative of the partial pressure of the first gas. This is achieved by virtue of the first sensor component 10 having a cavity 11, in which a sensor element 12 is arranged, and a layer 13 being arranged between the cavity 11 and the environment, said layer being selectively permeable to the first gas.

For the detection of hydrogen, the layer 13 can contain for example a material comprising one or more elements from a group containing graphene, a metal, a thin metal layer, Pd, Ni, Ti, PTFE, and PMMA.

As an alternative thereto, the layer 13 can also be configured such that it has through openings for the selective passage of the atoms or molecules of the first gas.

The embodiment in FIG. 1 is furthermore configured such that the sensor element 12 comprises a microelectromechanical sensor (MEMS) substantially consisting of a membrane, which experiences a deflection on account of the gas that has entered the cavity through the semipermeable layer 13, which deflection can be measured capacitively or piezoresistively, for example. The membrane can be formed in a first, lower silicon layer 14, while the cavity 11 is part of a second, upper silicon layer 15.

However, it holds true generally for the disclosure of the present application, in particular for the embodiments that will also follow further below, that the sensor element can be embodied in a wide variety of ways. In particular, the sensor element can comprise one or more elements from a group containing a pressure sensor, a thermal conductivity sensor, a speed of sound sensor, a pellistor, a catalytic sensor, a gas-selective sensor, a non-gas-selective sensor, an inductive sensor, a capacitive sensor, a resistive sensor, an optical sensor, or a magnetic sensor.

Furthermore, the embodiment in FIG. 1 is configured such that the second sensor component 20 can have a construction identical to the first sensor component 10, with the exception that no layer 13 is present, with the result that the cavity 11 is thus open toward the environment. This has the consequence that the second output signal of the second sensor component 20 is representative of the total pressure of the first gas and all further gases present in the environment.

Figure 2:
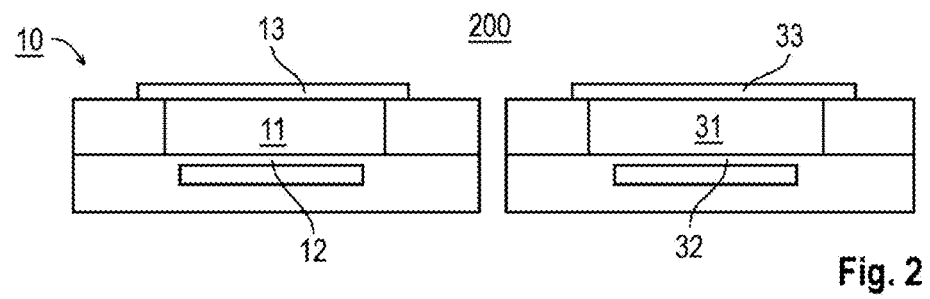
FIG. 2 shows a lateral cross-sectional view of one exemplary embodiment of a gas sensor, in which the first (left) sensor element has a hydrogen-permeable layer and the second (right) sensor element has a layer that is impermeable to all gases.

FIG. 2 shows a lateral cross-sectional view of one exemplary embodiment of a gas sensor in accordance with the present disclosure.

In the case of the embodiment in FIG. 2, a differential gas sensor 200 is embodied such that it has a first sensor component 10, which can be identical to the first sensor component 10 in FIG. 1, and so the same reference signs have also been used here, such that the first output signal is representative of the partial pressure of the first gas. By contrast, the second sensor component 30 is embodied such that it has a cavity 31 and a layer 33 is arranged between the cavity 31 and the environment, said layer being impermeable to hydrogen. That has the consequence that the second output signal is representative of the total pressure of all gases present in the environment with the exception of hydrogen. Instead of hydrogen, the layer 33 can also be impermeable to any other gas.

Both embodiments of differential gas sensors 100 and 200 in FIGS. 1 and 2 can furthermore be designed such that the first and second sensor components are arranged laterally next to one another in direct spatial proximity to one another. By way of example, both sensor components can be arranged on a common substrate. In this way, it can be ensured that at least approximately the same ambient conditions are applicable to both sensor components.

FIGS. 3A to 3E show lateral cross-sectional views for illustrating a method for producing a differential gas sensor.

In the case of the embodiment in FIGS. 3A to 3E, a differential gas sensor 300 is embodied such that it has a first sensor component 320 and a reference sensor 310. Both sensor components 310 and 320 are produced by depositing a sensor layer 323 and 313 over a sacrificial layer 316. After removing the sacrificial layer 316, the sensor components each have a cavity 311 and 321 and a perforated layers 313 and 323 between the cavity 311/321 and the environment, wherein the layers 313 and 323 can be embodied in a continuous fashion, as illustrated. These layers are provided with through openings 313.1 and 323.1 having different diameters.

In the case of the embodiment in FIGS. 3A to 3E, it is furthermore provided that the layers 313 and 323 themselves are part of a sensor element. They can be fabricated from (electrically conductive) polycrystalline silicon, for example, and, together with a bottom electrode 314 and respectively 324 composed of highly doped silicon, thus form a pressure-dependent sensor.

Figure 3A:
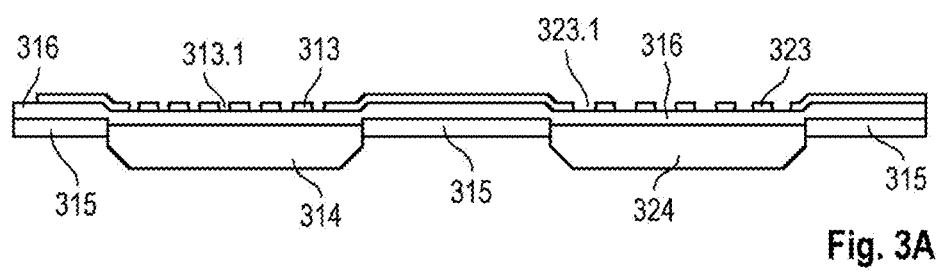
FIGS. 3A to 3E shows lateral cross-sectional views for illustrating a method for producing a differential gas sensor for the parallel detection of hydrogen and helium.
Figure 3B:
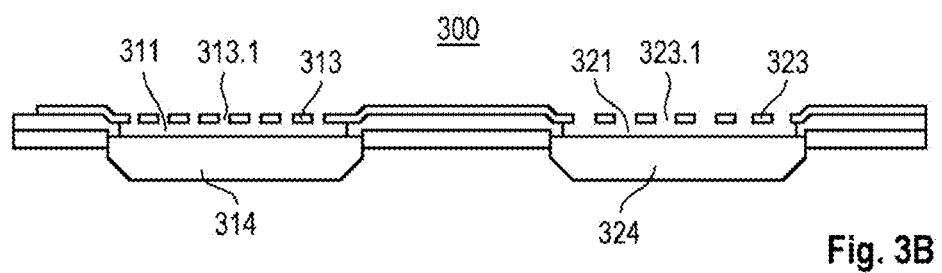

In accordance with FIG. 3A, a TEOS layer 316 is deposited onto the bottom electrodes 314/324, which are each surrounded by a field oxide layer 315, a polycrystalline layer then being deposited onto said TEOS layer. Afterward, the through openings 313.1/323.1 of the layer 313/323 can be formed for example by means of a directional etching process through a mask having corresponding openings. In the transition from FIG. 3A to FIG. 3B, the TEOS layer 316 is then removed below the layers 313/323 by means of an etching process.

Figure 3C:
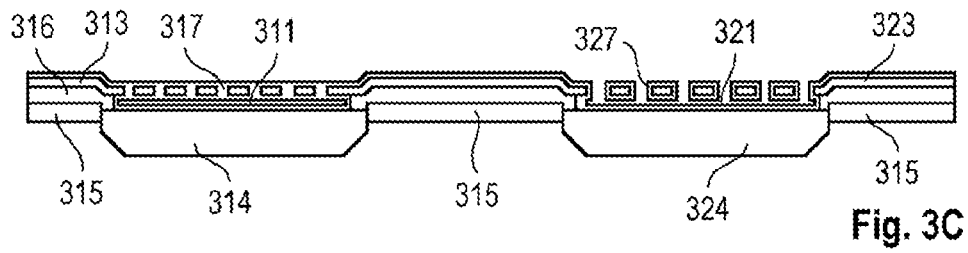
Figure 3D:
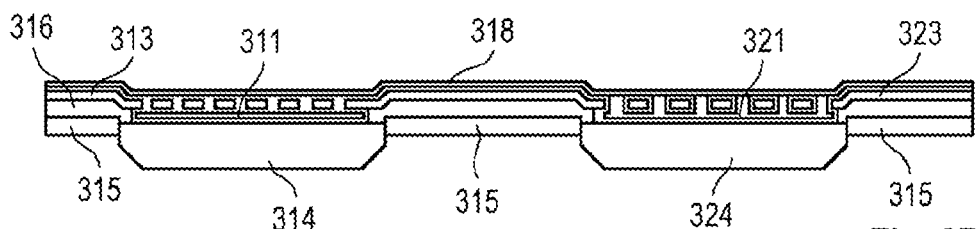

Furthermore, in accordance with FIG. 3C, a highly conformal layer 317 is deposited by means of a first sealing process step. Said layer hermetically lines the cavities 311 and 321 and completely seals the cavity 311. A dielectric such as SiN, constituting a barrier for all gases including hydrogen and helium, is chosen for this sealing process step.

In a second sealing process step, illustrated in FIG. 3A, a functional layer 318 composed of Ti, for example, is deposited. Said layer is permeable to hydrogen and helium and now also seals the cavity 321 for all other gases. In this cavity, therefore, the hydrogen partial pressure of the environment will equalize with the hydrogen partial pressure of the cavity. The same applies to the helium partial pressure.

Figure 3E:
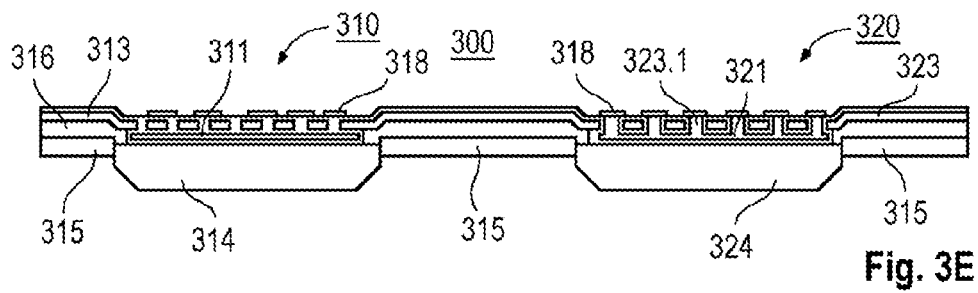

FIG. 3E shows the completed gas sensor 300. Here the functional layer 318 has also been structured, such that it is only still arranged above the through openings 313.1 and 323.1 in both components. This gas sensor 300 again contains a first sensor component 320, which is the sensor component that carries out the measurement, and a second sensor component 310 constituting the reference sensor. The first sensor component 320 has a cavity 321 separated from the environment by the polysilicon layer 323. The polysilicon layer 323 has through openings 323.1, the sidewalls of which are covered with SiN. The through openings 323.1 are furthermore covered with the Ti layer 318, which is selectively permeable to H2 and He. The first sensor component 320 additionally has a bottom electrode 324 composed of highly doped silicon, which together with the polysilicon layer 323 acts as a capacitor. The first sensor component 320 thus measures the total pressure of the environment without the partial pressures of H2 and He.

The second sensor component 310 likewise has a cavity 311 separated from the environment by a polysilicon layer 313, wherein this polysilicon layer 313 can be embodied in a continuous fashion with the polysilicon layer 323 of the first sensor component 320 as illustrated. The polysilicon layer 313 has through openings 313.1 completely filled with SiN. This complete filling with SiN thus constitutes a barrier for all gases including hydrogen and helium. The sensor element 310 is likewise covered with a Ti layer 318, the occupation density of the Ti layer on sensor elements 310 and 320 being identical. The second sensor component 310 additionally has a bottom electrode 314 composed of highly doped silicon, which together with the polysilicon layer 313 acts as a capacitor. The cavity 311 of the second sensor component 310 is thus completely sealed with respect to the environment and the second sensor component 310 thus measures the total pressure of all gases in the environment since said gases press the polysilicon layer 313 into the cavity 311 and the change in the capacitance of the capacitor that is caused as a result is a measure of the total pressure. The largely identical processing of both sensor components 320 and 310 with the same layer construction and the same occupation densities makes it possible for both sensors to have temperature coefficients matched to one another.

Figure 4A:
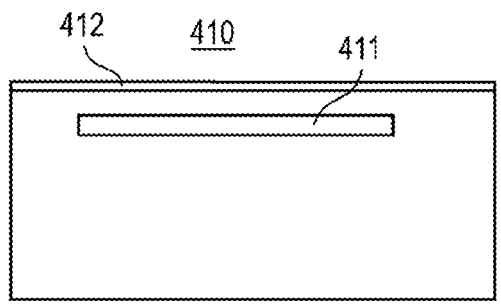
Figure 4A:
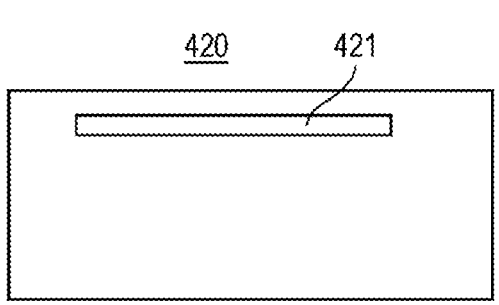

FIG. 4A shows one exemplary embodiment of a pressure-based gas sensor, in which the film stress of a functional layer dependent on the hydrogen partial pressure is used for the measurement.

FIG. 4A shows a first sensor component 410 in a greatly simplified form, which first sensor component can be a MEMS component fabricated from a semiconductor, such as silicon, and has a cavity 411. The silicon filament arranged over said cavity 411 constitutes a pressure-sensitive element again, which can be read by means of capacitive or piezoresistive methods. A functional Pd layer 412 is applied above the cavity 411 on the pressure-sensitive silicon filament of the sensor component 410. Said functional Pd layer 412 has the property that it increases its volume in the present of hydrogen. As a result, the layer 412 exerts pressure on the Si layer situated between the cavity 411 and the Pd layer 412 and thus produces a stress, i.e. mechanical stresses, in said Si layer. The ambient pressure additionally acts on the Si layer, and likewise produces a film stress in the Si layer. This total film stress can be measured for example by a piezoelectric sensor element in the cavity 411.

The second (reference) sensor component 420 is constructed, in principle, just like the first sensor component 410. It merely lacks the Pd layer 412 on the upper surface. As a result, the situation arises that the total pressure of all gases in the environment forms a loading on the upper surface of the Si layer situated over the cavity 411 and presses the layer into the cavity 411. This vertical displacement of the layer into the cavity can likewise be detected again by a piezoresistive sensor element in the Si layer. By means of an electronic circuit, the measurement signal of the reference sensor 420 can then be subtracted from the measurement signal of the sensor 410 and a signal proportional to the hydrogen partial pressure in the environment is obtained.

Figure 4B:
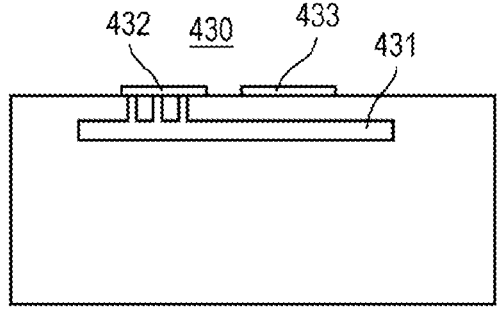
Figure 4B:
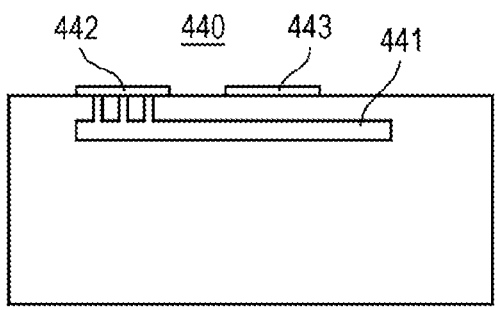

FIG. 4B shows a first sensor component 430 in a likewise greatly simplified form, which first sensor component can be a MEMS component fabricated from a semiconductor, such as silicon, and has a cavity 431. This cavity 431 is connected to the upper surface of the sensor component 430 via feedthroughs. A Pd layer 432 is applied above said feedthroughs, which layer is selectively permeable to H2. As a result, the H2 partial pressure can be established in the cavity 431. Furthermore, an SiN layer 433 is applied on the Si layer over the cavity. The total pressure minus the hydrogen partial pressure thus acts on the Si layer. This resulting pressure deforms the Si layer. A readout of this deformation is again possible capacitively or piezoresistively.

The associated (reference) sensor component 440 is constructed, in principle, just like the first sensor component 430 with the difference that the cavity 441 is connected to the upper surface of the sensor component 440 likewise via feedthroughs, but the latter are now sealed by the SiN layer 442, the SiN layer 442 being impermeable to all gases. The functional Pd layer 443 is likewise applied on the upper surface. The total pressure acts on the Si layer. By means of an electronic circuit, the measurement signal of the reference sensor 440 can then be subtracted from the measurement signal of the sensor 430 and a signal proportional to the hydrogen partial pressure in the environment is obtained.

Figure 5A:
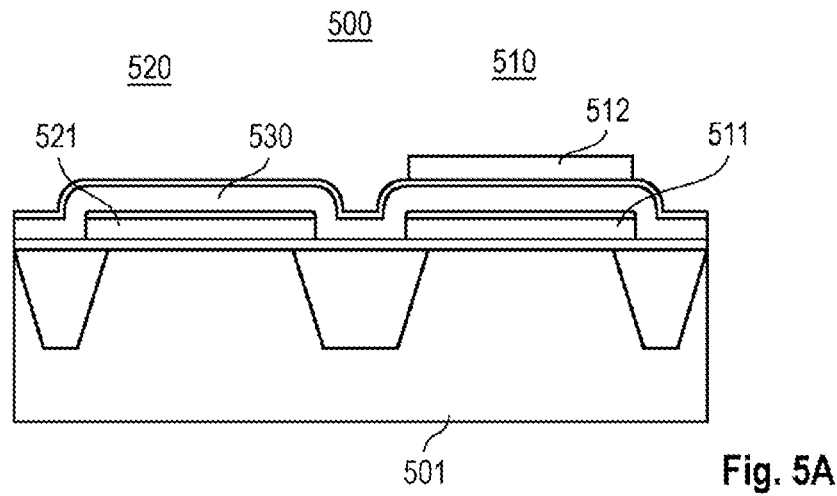
FIGS. 5A and 5B shows an exemplary embodiment based on the exemplary embodiment from FIG. 4A for the combination of a first sensor component having a Pd layer and a second conventional pressure sensor component in a lateral cross section (A) and a plan view (B) on one die.
Figure 5B:
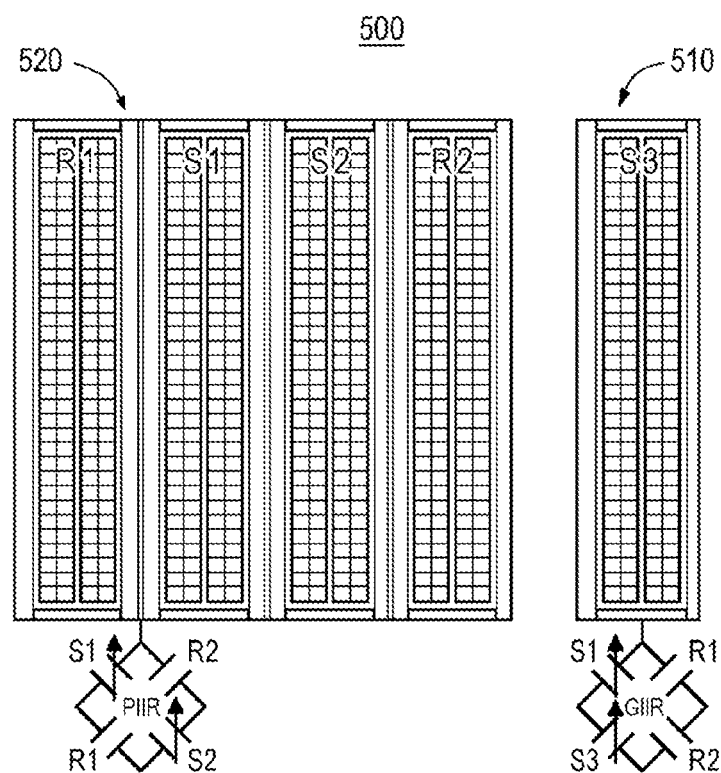

FIGS. 5A and 5B shows an exemplary embodiment of the combination of a first sensor component having a Pd layer and a second conventional pressure sensor element in a lateral cross section (A) and a plan view (B).

The differential gas sensor 500 in FIGS. 5A and 5B has a first sensor component 510 and a second (reference) sensor component 520. The first sensor component 510 contains a cavity 511 and the second sensor component 520 contains a cavity 521, wherein both cavities 511 and 521 are provided by a correspondingly shaped membranelike cover part 530. A Pd layer 512 is applied on the upper surface of that section of the cover part 530 which belongs to the first sensor component 510. As has already been explained further above, Pd has the property of increasing its volume in the presence of hydrogen. This property has the effect that the membranelike cover part bends depending on the hydrogen concentration, which can be detected by means of a suitable sensor element in the cavity 511. The concentration of hydrogen in the environment can thus be measured by the first sensor component 510.

The second sensor component 520 is a conventional pressure sensor in which a total pressure of all gases in the environment is measured, wherein the gases press the membranelike cover part into the cavity 521 and the accompanying vertical deflection of the membrane can be measured by a sensor element in the cavity.

The construction of the gas sensor 500 in FIG. 5B illustrates the functioning of the differential gas sensor on the basis of a change in volume of a Pd layer. The sensors of the second sensor component 520 consist of pressure-sensitive sensors (S1 and S2) and pressure-insensitive sensors (R1 and R2). By comparing the pressure-sensitive and pressure-insensitive sensors by way of a Wheatstone bridge, it is possible to determine a pressure signal (PIIR) of the surrounding gas freed of parasitic influences. Analogously to this, a comparison between the pressure-sensitive sensors (S1+S3) and the pressure-insensitive sensors (R1+R2) is carried out by way of a further Wheatstone bridge, with S3 being coated with Pd. The absolute pressure is thereby compensated by the pressure-sensitive sensors (Si and respectively S2). This results in a measurement variable GIIR indicating the gas concentration of the surrounding gas. In sum, therefore, it is possible to make a statement about the hydrogen concentration in the surrounding gas with simultaneous knowledge of the corresponding pressure.

Generally, a gas sensor of this type can be used for detecting various gases, but in particular hydrogen. The sensors can be fitted in or to any type of containers or lines in which gaseous hydrogen is stored or transported, in order in this way to carry out leak detection, for example. One important field of application is that of a fuel cell and here in particular at an inlet opening and/or an outlet opening or in the passenger compartment of a motor vehicle operated with a fuel cell.

EXAMPLES

Devices and methods in accordance with the disclosure are explained below on the basis of examples.

Example 1 is a differential gas sensor, comprising a first sensor component configured to selectively detect a first gas present in the environment and to supply a first output signal, a second sensor component configured to supply a second output signal, and
 a circuit configured to determine a difference between the first output signal and the second output signal.

Example 2 is a differential gas sensor according to example 1, wherein the first output signal is representative of the partial pressure of the first gas, and the second output signal is representative of the total pressure of all further gases present in the environment.

Example 3 is a differential gas sensor according to example 1, wherein the second output signal is representative of the total pressure of the first gas and all further gases present in the environment.

Example 4 is a differential gas sensor according to example 1, wherein the second sensor component is configured to detect no gas, and the second output signal is a zero signal.

Example 5 is a differential gas sensor according to any of the preceding examples, wherein the first sensor component has a functional layer, which interacts with the first gas.

Example 6 is a differential gas sensor according to example 5, wherein the first sensor component has a cavity and the functional layer is selectively permeable to the first gas and is arranged between the cavity and the environment.

Example 7 is a differential gas sensor according to example 6, wherein the material of the functional layer is selectively permeable to the first gas.

Example 8 is a differential gas sensor according to example 7, wherein the functional layer contains a material comprising one or more elements from a group containing graphene, a metal, a thin metal layer, Pd, Ni, Ti, PTFE, and PMMA.

Example 9 is a differential gas sensor according to example 7 or 8, wherein the material of the functional layer is selectively permeable to hydrogen or helium.

Example 10 is a differential gas sensor according to any of examples 1 to 6, wherein the functional layer has through openings for the selective passage of the first gas.

Example 11 is a differential gas sensor according to any of examples 6 to 10, wherein a sensor element is arranged in the cavity.

Example 12 is a differential gas sensor according to any of examples 6 to 10, wherein the functional layer is part of a sensor element.

Example 13 is a differential gas sensor according to example 11 or 12, wherein the sensor element comprises a microelectromechanical sensor (MEMS).

Example 14 is a differential gas sensor according to any of examples 11 to 13, wherein the sensor element comprises one or more elements from a group containing a pressure sensor, a thermal conductivity sensor, a speed of sound sensor, a pellistor, a catalytic sensor, a gas-selective sensor, a non-gas-selective sensor, an inductive sensor, a capacitive sensor, a resistive sensor, an optical sensor, or a magnetic sensor.

Example 15 is a differential gas sensor according to any of the preceding examples, wherein the functional layer is structured.

Example 16 is a differential gas sensor according to example 13, wherein the functional layer comprises a plurality of regularly arranged partial layers.

Example 17 is a differential gas sensor according to example 5 or any of the preceding examples referring back to example 5, wherein the functional layer is configured in such a way that it experiences a change in volume upon contact with the first gas.

Example 18 is a differential gas sensor according to example 17, wherein the first sensor component has a cavity, wherein the functional layer can be fitted outside on a wall of the cavity and pressing of the wall into the cavity can be detected.

Example 19 is the use of a differential gas sensor according to any of examples 1 to 18 for detecting hydrogen.

Example 20 is the use of a differential gas sensor according to example 19 in the case of a container, or in the case of lines in which gaseous hydrogen is stored or transported.

Example 21 is the use of a gas sensor according to any of examples 1 to 18 in the case of a fuel cell.

Example 22 is the use of a gas sensor according to example 21, wherein the gas sensor is fitted at an inlet opening and/or an outlet opening of the fuel cell.

Example 23 is the use of a gas sensor according to any of examples 1 to 18 in the passenger compartment of a motor vehicle operated with a fuel cell.

Example 24 is the use of a gas sensor according to any of examples 1 to 18 for leak detection, in particular of hydrogen.

Although specific embodiments have been illustrated and described here, those of ordinary skill in the art will appreciate that a large number of alternative and/or equivalent implementations can replace the specific embodiments shown and described, without the scope of the present disclosure being exceeded. This application is intended to cover all adaptations or variations of the specific embodiments discussed here. Therefore, the intention is for this disclosure to be restricted only by the claims and the equivalents thereof.

What is claimed is:

1. A differential gas sensor, comprising:
    a first sensor component configured to selectively detect a first gas present in the environment and to supply a first output signal, wherein the first sensor component comprises:
        a functional layer;
        an electrode;
        a first cavity interposed between the functional layer and the electrode, wherein the first cavity is free of a solid material, and wherein the first cavity is configured to accept the first gas; and
        a polysilicon layer interposed between the functional layer and the first cavity, wherein the functional layer covers a first through opening in the polysilicon layer;
    a second sensor component configured to supply a second output signal; and
    a circuit configured to determine a difference between the first output signal and the second output signal.

2. The differential gas sensor as claimed in claim 1, wherein
    the first output signal is representative of a partial pressure of the first gas, and
    the second output signal is representative of a total pressure of all further gases present in the environment.

3. The differential gas sensor as claimed in claim 1, wherein
    the second output signal is representative of a total pressure of the first gas and all further gases present in the environment.

4. The differential gas sensor as claimed in claim 1, wherein
    the second sensor component is configured to detect no gas, and the second output signal is a zero signal.

5. The differential gas sensor as claimed in claim 1, wherein
    the functional layer interacts with the first gas.

6. The differential gas sensor as claimed in claim 1 wherein
    the functional layer is selectively permeable to the first gas and is arranged between the first cavity and the environment.

7. The differential gas sensor as claimed in claim 1, wherein
    a material of the functional layer is selectively permeable to the first gas.

8. The differential gas sensor as claimed in claim 1, wherein
    the functional layer contains a material comprising one or more elements from a group containing graphene, a metal, a thin metal layer, Pd, Ni, Ti, PTFE, and PMMA.

9. The differential gas sensor as claimed in claim 1, wherein
    a material of the functional layer is selectively permeable to hydrogen or helium.

10. The differential gas sensor as claimed in claim 9, wherein
    the functional layer has second through openings for selective passage of the first gas.

11. The differential gas sensor as claimed in claim 1, wherein
    a sensor element is arranged in the first cavity.

12. The differential gas sensor as claimed in claim 11, wherein
    the functional layer is part of the sensor element.

13. The differential gas sensor as claimed in claim 11, wherein
    the sensor element comprises a microelectromechanical sensor (MEMS).

14. The differential gas sensor as claimed in claim 11, wherein
    the sensor element comprises one or more elements from a group containing a pressure sensor, a thermal conductivity sensor, a speed of sound sensor, a pellistor, a catalytic sensor, a gas-selective sensor, a non-gas-selective sensor, an inductive sensor, a capacitive sensor, a resistive sensor, an optical sensor, or a magnetic sensor.

15. The differential gas sensor as claimed in claim 1, wherein
    the functional layer comprises a plurality of second through openings.

16. The differential gas sensor as claimed in claim 1, wherein
    the functional layer comprises a plurality of regularly and laterally arranged portions.

17. The differential gas sensor as claimed in claim 1, wherein
    the functional layer is configured in such a way that it experiences a change in volume upon contact with the first gas.

18. The differential gas sensor as claimed in claim 17, wherein
    the functional layer is fitted outside on a wall of the first cavity and pressing of the wall into the first cavity can be detected.

19. A method of detecting hydrogen, the method comprising utilizing the differential gas sensor of claim 1.

20. The method of claim 19, wherein hydrogen is detected in a container, or in lines in which gaseous hydrogen is stored or transported.

21. A method of detecting hydrogen outside of a fuel cell, the method comprising utilizing the differential gas sensor of claim 1.

22. The method of claim 21, wherein
    the differential gas sensor is fitted at an inlet opening and/or an outlet opening of the fuel cell.

23. A method of detecting hydrogen in a passenger compartment of a motor vehicle operated with a fuel cell, the method comprising utilizing the differential gas sensor of claim 1.

24. A method for leak detection of hydrogen, the method comprising utilizing the differential gas sensor of claim 1.

* * * * *